(12) United States Patent
Yamamoto

(10) Patent No.: US 9,576,372 B2
(45) Date of Patent: Feb. 21, 2017

(54) OBJECT DETECTING APPARATUS, OBJECT DETECTING METHOD, AND PROGRAM

(71) Applicant: CANON KABUSHIKI KAISHA, Tokyo (JP)

(72) Inventor: Takahisa Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/689,312

(22) Filed: Apr. 17, 2015

(65) Prior Publication Data

US 2015/0324995 A1 Nov. 12, 2015

(30) Foreign Application Priority Data

May 9, 2014 (JP) ................. 2014-097871

(51) Int. Cl.
| | | |
|---|---|---|
| *G06K 9/00* | (2006.01) | |
| *G06T 7/00* | (2006.01) | |
| *G06K 9/46* | (2006.01) | |
| *G06K 9/62* | (2006.01) | |
| *G06K 9/32* | (2006.01) | |

(52) U.S. Cl.
CPC ......... *G06T 7/0081* (2013.01); *G06K 9/3233* (2013.01); *G06K 9/4642* (2013.01); *G06K 9/4671* (2013.01); *G06K 9/6215* (2013.01); *G06T 2207/20021* (2013.01); *G06T 2207/20144* (2013.01); *G06T 2207/20164* (2013.01)

(58) Field of Classification Search
CPC ............ G06T 7/0081; G06T 7/0083; G06T 2207/20021; G06T 2207/20164; G06T 2207/20144; G06T 2207/10016; G06K 9/4642; G06K 9/4671; G06K 9/6215
See application file for complete search history.

(56) References Cited

U.S. PATENT DOCUMENTS

| 6,282,317 | B1 | 8/2001 | Luo et al. | |
|---|---|---|---|---|
| 7,474,775 | B2 * | 1/2009 | Abramoff ............ | G06K 9/6277 351/206 |
| 8,478,046 | B2 * | 7/2013 | Dejean ............... | G06K 9/00469 382/173 |
| 8,948,522 | B2 * | 2/2015 | Ding .................... | G06K 9/6269 382/155 |
| 9,208,377 | B2 * | 12/2015 | Mizuno .............. | G06K 9/00369 |

(Continued)

FOREIGN PATENT DOCUMENTS

| JP | 2000207564 A | 7/2000 |
|---|---|---|
| JP | 2011034311 A | 2/2011 |

*Primary Examiner* — Amir Alavi
(74) *Attorney, Agent, or Firm* — Rossi, Kimms & McDowell LLP

(57) ABSTRACT

A detection result of an object useful to an application can be obtained. A designated condition determining unit designates a condition of a region (improper region) which is not used as a detection result of a main object on the basis of application information which was input. An improper region identifying unit identifies an improper region on the basis of the improper region condition which was input. A final region identifying unit identifies a final main object region from a salient main object candidate region output from a candidate region identifying unit and the improper region output from the improper region identifying unit.

12 Claims, 7 Drawing Sheets

(56) References Cited

U.S. PATENT DOCUMENTS

2015/0187077 A1* 7/2015 Ozaki .................. G06T 7/0042
382/133
2015/0324995 A1* 11/2015 Yamamoto ............ G06T 7/0081
382/173

* cited by examiner

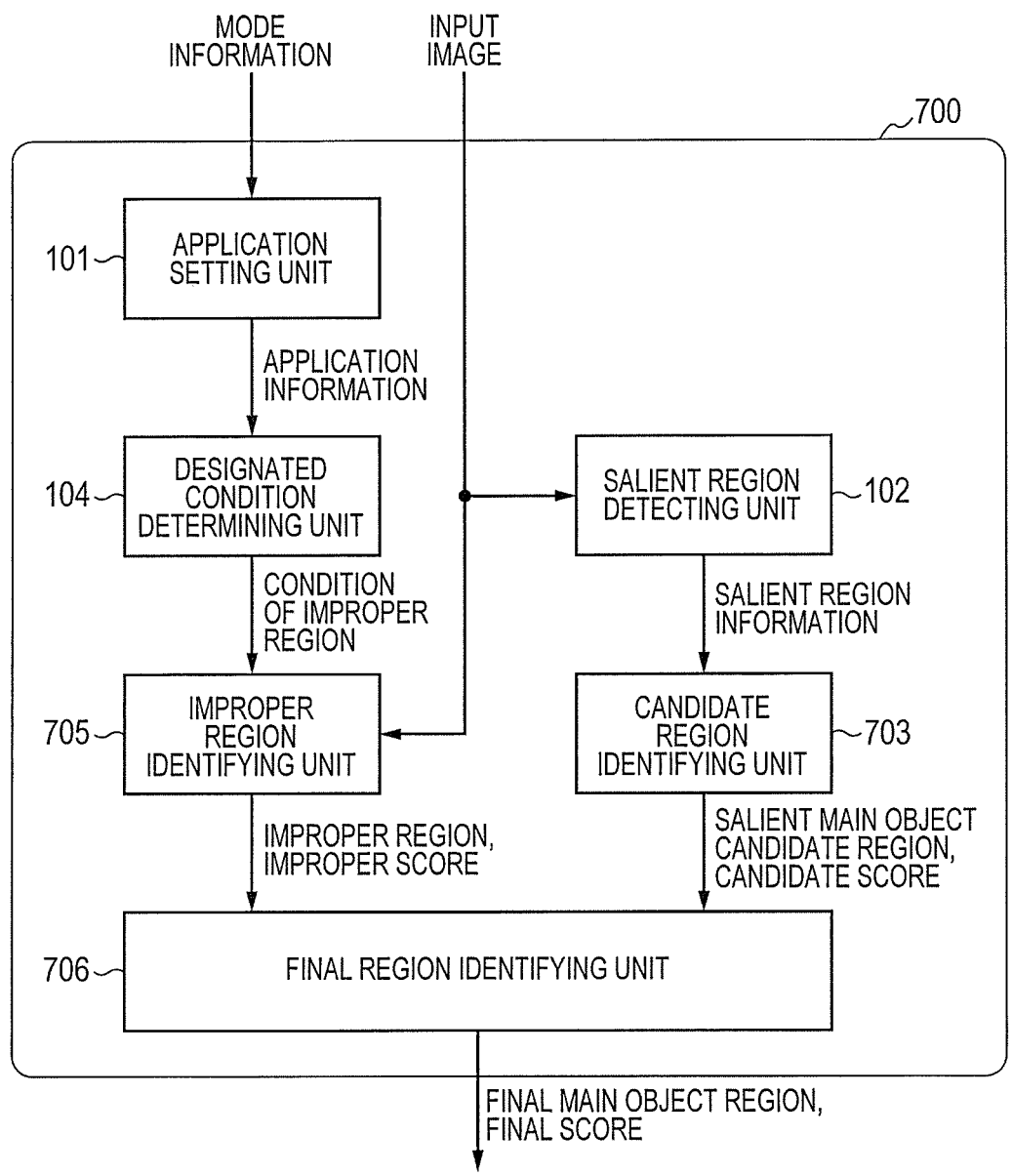

OBJECT DETECTING APPARATUS, OBJECT DETECTING METHOD, AND PROGRAM

BACKGROUND OF THE INVENTION

Field of the Invention

The present invention relates to an object detecting apparatus, an object detecting method, and a program for detecting a main object from an input image.

Description of the Related Art

Generally, in an image such as a photograph or the like, a main object is such an object (human, body, or the like) that the photographer wants to fetch it into an image. However, since an intention of the photographer can be known only by the photographer himself, when the third person intends to identify the main object, it is necessary to presume the intention of the photographer. It is, therefore, very difficult to accurately detect the main object matched with the intention of the photographer.

Therefore, in the related arts, as a method of detecting the main object without presuming the intention of the photographer, methods of detecting the main object from an image on the basis of a salient region in the image have been examined. Those methods can be regarded as a detecting method of the main object based on such an experience that the main object is salient among many images.

Although the methods of detecting the main object from the image on the basis of the salient region in the image have been examined as a method of detecting the main object as mentioned above, those methods have the following problems.

First, in the case of identifying the main object region on the basis of the salient region, there is such a problem that even if the region is salient, how to handle a region which is not the main object is unclear. Since the desired main object of the photographer can be known only by the photographer himself as mentioned above, the region which is not the main object can be also known only by the photographer himself. Therefore, the Official Gazette of Japanese Patent Application Laid-Open No. 2000-207564 also discloses a method of determining a main object region in consideration of not only a saliency but also a position and a size in an image or information showing what is in its salient region.

Generally, in many cases, an object to detect a main object is to realize a specific application by using its detection result. For example, in the case of presuming a case where a function to detect a main object is used in a digital camera or the like, the following applications are considered. That is, there is considered a method whereby by auto-focusing (AF) on a main object region, photographing of a picture matched with an intention of the photographer is enabled. Or, such an application that even if a main object is moved, by auto-tracking on a main object region, a shutter chance is not lost or the like can be presumed.

However, according to the prior arts, nothing is considered about a point that a detection result of the main object is evaluated from a viewpoint such as usefulness of such an application. Further, in the case of a method disclosed in the Official Gazette of Japanese Patent Application Laid-Open No. 2011-34311, there is also such a possibility that a region which is not a main object although it is salient is erroneously detected as a main object.

In consideration of the foregoing problems, it is an aspect of the invention that a detection result of an object which is useful to an application can be obtained.

SUMMARY OF THE INVENTION

According to an aspect of the invention, an object detecting apparatus comprises: an identifying unit configured to identify a candidate region of an object based on an input image; a setting unit configured to set a region to be excluded from the candidate region of the object in the input image, according to an application using information of the object; and a detecting unit configured to detect a region of the object, based on the candidate region identified by the identifying unit and the region set by the setting unit.

Further features of the present invention will become apparent from the following description of exemplary embodiments with reference to the attached drawings.

BRIEF DESCRIPTION OF THE DRAWINGS

FIG. 7 is a block diagram illustrating an example of a functional construction of a main object detecting apparatus according to the third embodiment.

DESCRIPTION OF THE EMBODIMENTS

Preferred embodiments of the present invention will now be described in detail in accordance with the accompanying drawings.

(First Embodiment)

The first embodiment of the invention will be described hereinbelow. In the embodiment, an erroneous detection of a main object is reduced, thereby preventing such a situation that, particularly, a detection result of the main object which is not useful for an application using the detection result of the main object is used. In the embodiment, an example in which a detecting apparatus of a main object is used in a digital camera and, when the photographer takes a picture, the main object is detected will be described.

Figure 1:
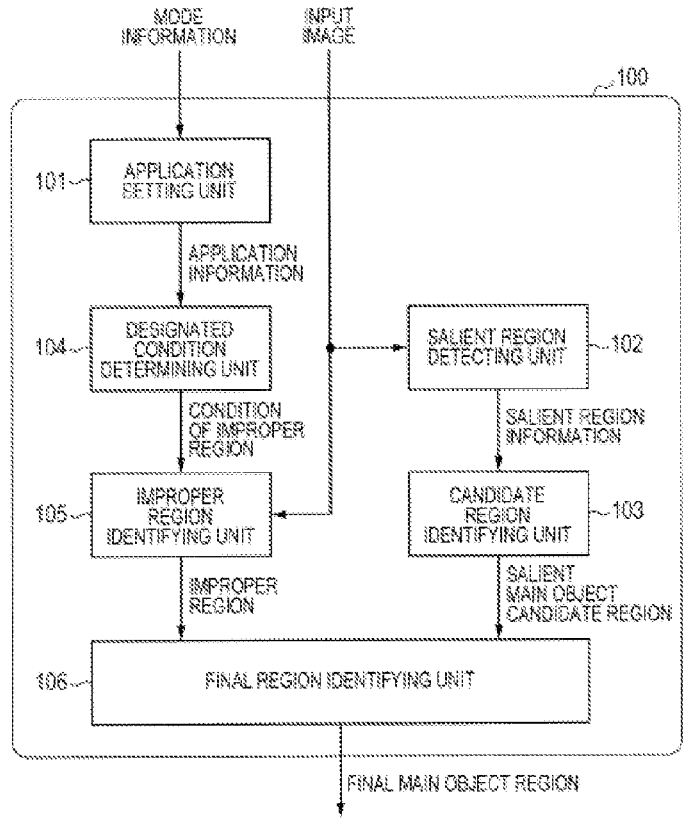
FIG. 1 is a block diagram illustrating an example of a functional construction of a main object detecting apparatus according to the first embodiment.

FIG. 1 is a block diagram illustrating an example of a functional construction of a main object detecting apparatus 100 according to the embodiment.

In FIG. 1, an input image serving as a target from which a main object is detected and mode information, which will be described hereinafter, are input to the main object detecting apparatus 100. Information of a final main object region serving as a detection result of the main object is output from the main object detecting apparatus 100. Further, information regarding an application desired to be achieved by using an output result of the main object detecting apparatus 100 is input from an application setting unit 101.

FIGS. 8A to 8E are diagrams schematically illustrating processing results in the main object detecting apparatus 100 according to the embodiment. A process of each block illustrated in FIG. 1 will be described hereinbelow with reference to FIGS. 8A to 8E.

The application setting unit 101 sets an application desired to be achieved by using the detection result of the main object, and outputs information regarding the set application to a designated condition determining unit 104. As an example of the application desired to be achieved by using the detection result of the main object, an auto-focus (AF), an auto-exposure (AE), an auto-tracking, and the like are presumed. In the case of AF and AE, by auto-focusing (AF) and auto-exposing (AE) on a position of the main object identified based on the detection result of the main object, photographing of a picture matched with the intention of the photographer is enabled. On the other hand, by auto-tracking on the main object region, such a function that even if the main object is moved, a shutter chance is not lost can be realized.

There is also a case where a feature of the main object desired to be detected differs in accordance with the application to be realized by using the detection result of the main object. In other words, even if the detection result of the main object to which the intention of the photographer has accurately been reflected was obtained, there is also a case where the detection result is improper in dependence on the application. For example, in the case of AF, even if a region of an extremely small contrast is detected as a main object, it is very difficult to auto-focus on such a region, and its detection result is improper to the application of AF.

Consequently, it is important not only to reduce such an erroneous detection that the main object which is not desired by the photographer is detected but also to prevent an obtainment of the detection result of the main object which is not useful to the application using the detection result of the main object. That is, it is important to obtain the detection result of the main object which is useful to the application using the detection result of the main object.

Such a problem that it is necessary to consider a usefulness to the application using the detection result of the main object is also caused by such a fact that the main object cannot be inherently defined if there is no intention of the photographer. In order to easily describe such a point, such a detection is now compared with a face detection serving as a general detection target.

A face in an image can be defined from features of organs such as eyes, mouth, nose, and the like and their layout relation. In the face detection, a position and a size of the face are identified from the image by using information including such features of organs and their layout relation. Therefore, for the application using the face detection as well, a feature of the face detection result can be preliminarily assumed. That is, in the application, it is possible to presume that the region of the face detection result which is obtained in the face detection is a region where the organs having predetermined features exist with a predetermined layout relation. Therefore, the usefulness of the face detection result for the application can be preliminarily assumed based on such a presumption.

For example, in the case of auto-focusing on the face detection result, when considering the feature which is presumed as a face detection result, whether or not there is a contrast enough to auto-focus can be discriminated prior to performing the face detection. Therefore, for example, if it is decided that the feature which is presumed as a face detection result has the contrast enough to auto-focus, the face detection result is always useful to AF irrespective of the image.

On the other hand, in the case of detecting the main object, the main object cannot be accurately defined from the image as mentioned above. Therefore, what kind of feature the region serving as a detection result has cannot be previously assumed. For example, in the case of the application of AF, whether or not the detection result of the main object is useful to AF cannot be previously discriminated. That is, in dependence on the image serving as a detection target, there is a case where the detection result of the main object is useful to AF or there is a case where it is not useful. Therefore, in the case of the main object detection, to the application to be achieved by using the detection result of the main object, in order to accomplish the application, it is extremely important to consider whether or not the detection result is useful. Accordingly, in the embodiment, information of the useful application is obtained by the following method.

As a setting method of the application in the application setting unit 101, a method of setting by inputting mode information such as a photographing mode or the like set in a digital camera or the like is considered. For example, in an auto-focus mode, the application setting unit 101 outputs AF as application information. In the case of an auto-tracking mode, a method whereby auto-tracking is output as application information or the like is considered. It is also possible to use such a construction that an operation unit (not shown) is operated by the photographer himself and application information can be manually decided.

To the input image which is input, a salient region detecting unit 102 executes a process for detecting a salient region in the image. A detailed construction in the salient region detecting unit 102 will be described with reference to FIG. 2.

Figure 2:
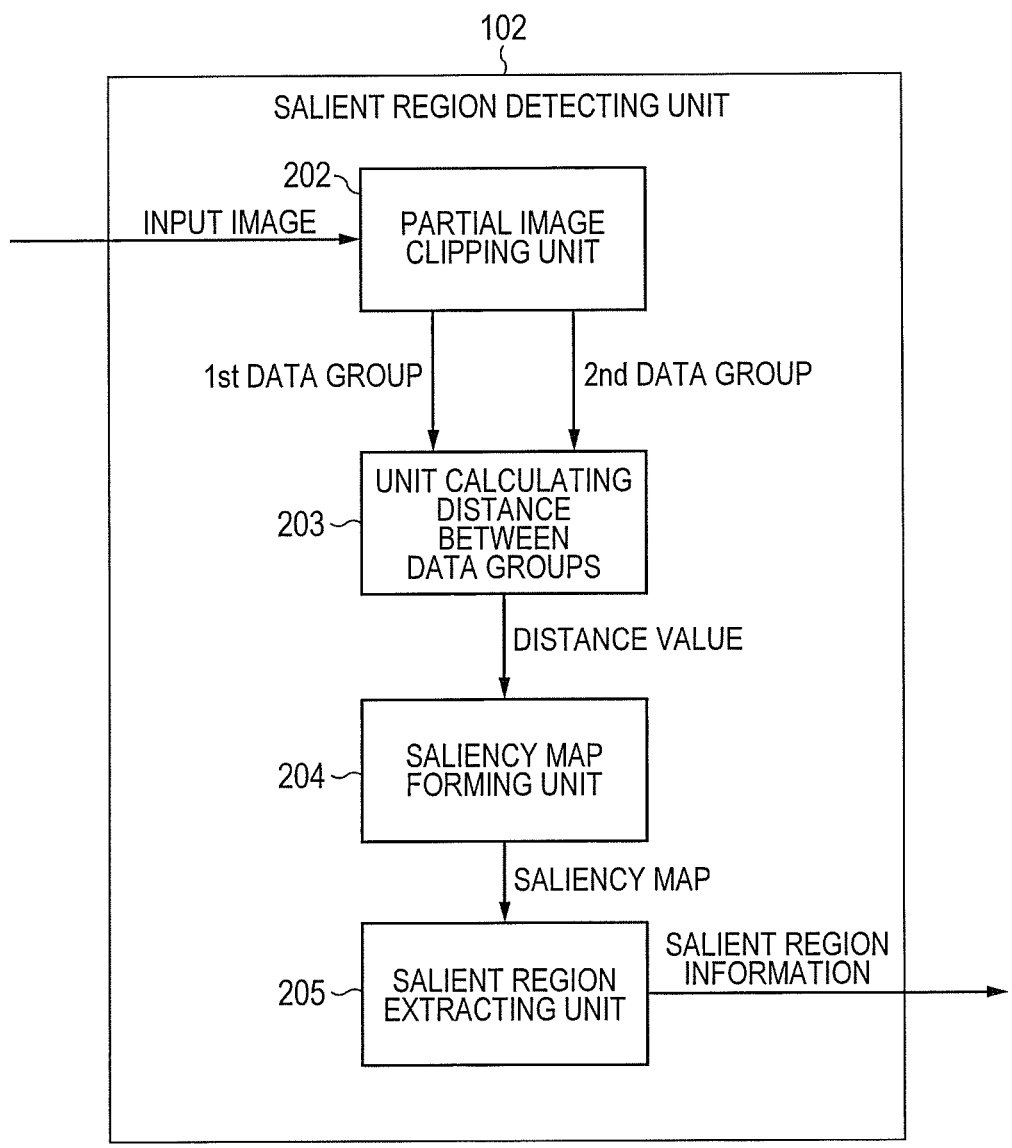
FIG. 2 is a block diagram illustrating an example of a detailed construction of a salient region detecting unit according to the embodiment.

FIG. 2 is a block diagram illustrating an example of the detailed construction of the salient region detecting unit 102.

In FIG. 2, a partial image clipping unit 202 scans a scan window to the input image and outputs a partial image clipped at a certain scan position to a unit 203 for calculating a distance between data groups.

Figure 3:
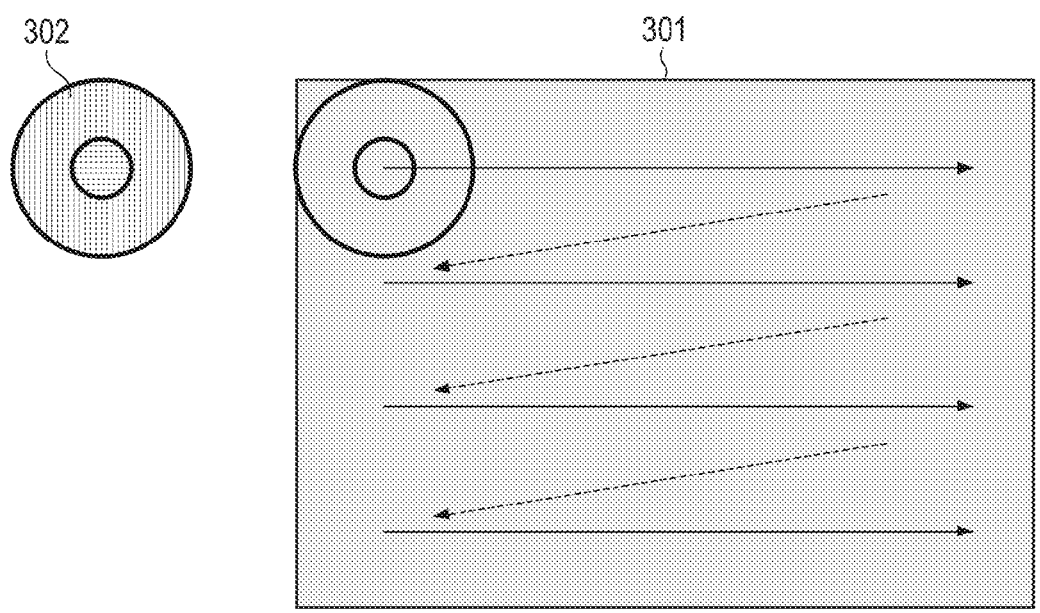
FIG. 3 is a diagram illustrating an example of an input image and a scan window.

FIG. 3 is a diagram illustrating an example of the input image and the scan window. As illustrated in FIG. 3, a scan window 302 is scanned in directions shown by arrows in an input image 301, and the input image is clipped at each scan position and output to the calculating unit 203 of the distance between the data groups. In the embodiment, at each scan position, an image locating in a region (doughnut-shaped region) on the outer peripheral side of the scan window 302 is output as a first data group. An image locating in an inner region (circular-shaped region) of the scan window 302 is output as a second data group. Therefore, each time the scan position of the scan window is moved, the two data groups are output to the calculating unit 203 of the distance between the data groups.

The calculating unit 203 of the distance between the data groups calculates a value of the distance between the two data groups which are input. Since the data is output from the partial image clipping unit 202 each time the scan window 302 is moved, the calculating unit 203 of the distance between the data groups calculates the distance value and outputs to a saliency map forming unit 204. A calculating method of the distance between the two data groups is not particularly limited but a well-known method may be used. For example, a method whereby histograms are formed to the two data groups which are input and a differential absolute value sum is calculated per each of bins for both histograms.

Figure 8A:
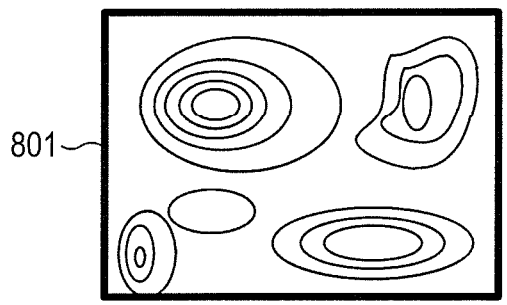
FIGS. 8A, 8B, 8C, 8D and 8E are diagrams schematically illustrating processing results in the main object detecting apparatus.

The saliency map forming unit 204 maps the distance value which is input from the calculating unit 203 of the distance between the data groups. That is, since the distance value is calculated every scan position, the distance value is mapped to a position corresponding to the scan position in the input image. In this manner, the calculated distance value is regarded as a saliency and data in which the saliency is imaged (saliency map) is formed. The saliency map which is formed by the saliency map forming unit 204 is schematically illustrated in FIG. 8A. In a saliency map 801, a magnitude of the saliency is shown by a contour line in the map.

Figure 8B:
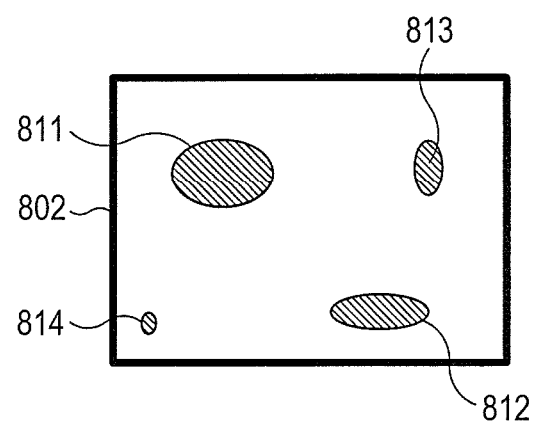

A salient region extracting unit 205 executes a binarizing process by a predetermined threshold value to the input saliency map and outputs coordinates of a center of gravity of a region having a distance value (saliency) exceeding the threshold value, an area, a saliency per area, and the like as salient region information. An example of salient region information 802 extracted by the salient region extracting unit 205 is illustrated in FIG. 8B. Regions 811 to 814 indicate salient regions exceeding the threshold value and remaining as results obtained by processing the saliency map 801 based on the threshold value. Those salient regions are extracted by the salient region extracting unit 205.

Returning to the description of FIG. 1, a candidate region identifying unit 103 identifies a main object candidate region based on the saliency by using the salient region information which is output from the salient region detecting unit 102. For example, in the candidate region identifying unit 103, scores are calculated by executing a weight adding process to elements (coordinates of the center of gravity of the region, area, saliency per area, and the like) constructing the salient region information which is output from the salient region detecting unit 102, and the region of a large score is set to the candidate region of the main object. By such a process, the candidate region of the main object can be identified in consideration of the position and size in the image in addition to the saliency. The candidate region of the main object identified in this manner is output as a salient main object candidate region to a final region identifying unit 106. A region group identified by the candidate region identifying unit 103 is illustrated in an image 803 in FIG. 8C. Among the regions 811 to 814 illustrated in FIG. 8B, the regions other than the region 814 are set to salient main object candidate regions 821 to 823.

Application information is input from the application setting unit 101 to the designated condition determining unit 104. On the basis of the application information which was input, the designated condition determining unit 104 designates a condition of the region (improper region) which is not used as a detection result of the main object.

When what kind of application information is input, which one of the regions is set to the improper region has been preset. For example, if AF has been preset as an application using the detection result of the main object, AF is input as application information to the designated condition determining unit 104. When a contrast detection method is used as a method of realizing AF, there is a case where AF becomes unstable to a region of a weak contrast. Therefore, a condition of "low contrast" is designated as an improper region condition.

For example, if auto-tracking has been preset as an application using the detection result of the main object, auto-tracking is input as application information to the designated condition determining unit 104. In this case, when an image to be photographed is a scenery image, there are many cases where a main object having a motion serving as a target of auto-tracking does not exist. Therefore, a condition of "scenery image" is designated as an improper region condition. Besides the scenery image, in the case where an equal texture exists in whole of the image such as a case where a wall is photographed in whole of the image or the like, there are also many cases where a main object having a motion serving as a target of auto-tracking does not exist. Therefore, a condition of "equal texture in whole of the image" is designated as an improper region condition. As mentioned above, the improper region condition corresponding to the application information has been preset in the designated condition determining unit 104 and the improper region condition corresponding to the application information which is input is output.

The improper region condition which was output from the designated condition determining unit 104 is input to an improper region identifying unit 105. The improper region identifying unit 105 identifies an improper region in accordance with the improper region condition which was input. An example in which an improper region 810 has been set is illustrated in an image 804 in FIG. 8D. That is, an example in which the improper region 810 has been set by the improper region identifying unit 105 is illustrated.

For example, when the condition of "low contrast" is input as an improper region condition, a low contrast region is detected from the input image. Although a detecting method of the low contrast region is not particularly limited, for example, a scan window of a certain size is scanned in the image and, at each scan position in the image, an edge amount in the scan window (edge integration value in the window) is calculated. A region whose edge integration value is smaller than a predetermined value may be set as a low contrast region. The low contrast region which was identified in this manner is output as an improper region.

For example, when the condition of "scenery image" is input as an improper region condition, whether or not the input image is a scenery image is discriminated. Although a discriminating method of the scenery image is not particularly limited either, for example, a discriminating method of a horizon (horizontal line) image serving as a typical scenery image is used.

Figure 4:
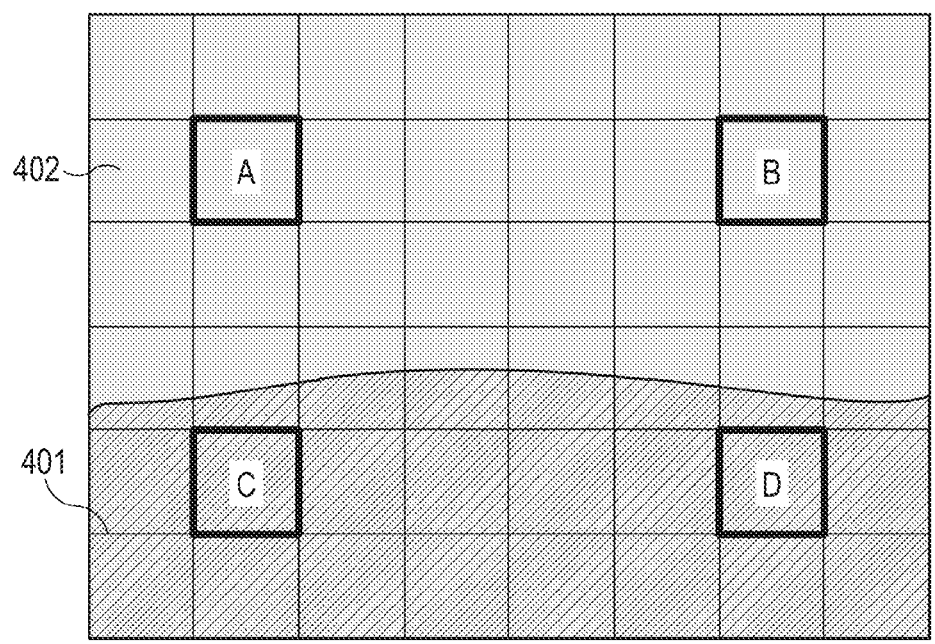
FIG. 4 is a diagram illustrating an example in which the input image is divided into tile-shaped regions by a predetermined size.

FIG. 4 is a diagram illustrating an example in which the input image is divided into tile-shaped regions by a predetermined size. In FIG. 4, it is assumed that a hatching region 401 shown by oblique lines indicates a ground region and a non-hatching region 402 shows a sky region. In the case of the horizon (horizontal line) image, since the region is divided into a ground (sea) region and a sky region by a line near the horizontal line, among the tiles arranged in the horizontal direction, their colors and brightness are similar. It is presumed that among the tiles arranged in the vertical direction, combinations of different colors and brightness exist. By using such a principle, the horizon (horizontal line) image is discriminated.

Specifically speaking, a brightness average value and an RGB average value in the tile are calculated and the average values are compared with respect to combinations of predetermined tiles. For example, as illustrated in FIG. 4, they are compared with respect to a combination of tiles A and B, a combination of tiles A and C, a combination of tiles B and D, and a combination of tiles C and D, respectively. In the case of the horizon (horizontal line) image, when comparing the tiles A and B or the tiles C and D, a difference between the average values is small, and when comparing the tiles A and C or the tiles B and D, a difference between the average values is large. By performing such a comparison of the tile pair with respect to a number of tile pairs, the horizon (horizontal line) image is discriminated.

Similarly, for example, when the condition of "equal texture in whole of the image" is input as an improper region condition, whether or not the whole of the input image is the equal texture is discriminated. Although a discriminating method of the equal texture is not particularly limited, a method whereby the input image is divided into tiles and, among the predetermined tiles, brightness average values and RGB average values in the tiles are compared with respect to predetermined tiles is considered in a manner similar to the case of the discrimination of the horizon (horizontal line) image. In the case of the equal texture in whole of the image, it is presumed that even if they are compared with respect to any tile pair, the difference is small. By performing such a comparison of the tile pair with respect to a number of tile pairs, whether or not the whole image is an image of the equal texture is discriminated.

In the case of discriminating the improper region by using the whole image like a discrimination about the horizon (horizontal line) image or the equal texture, information about whether or not the whole image is set to the improper region is output as an improper region. In other words, if it is determined that the input image is the horizon (horizontal line) image or the image of the equal texture, it is decided that the whole image is the improper region. If it is determined that the input image is neither the horizon (horizontal line) image nor the image of the equal texture, it is decided that the improper region does not exist in the image.

Figure 8C:
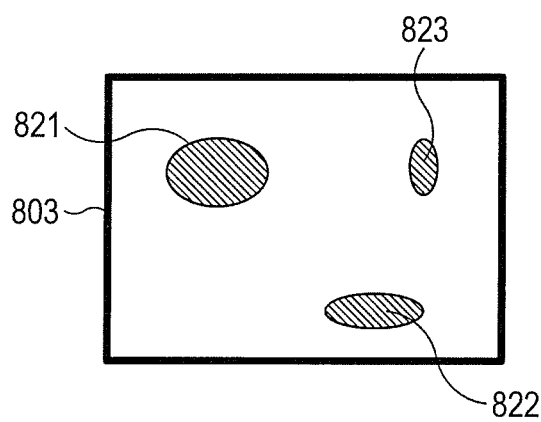
Figure 8D:
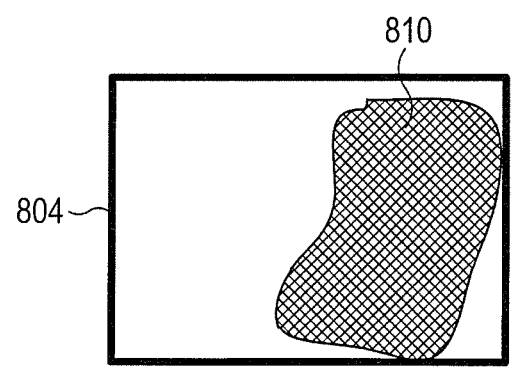
Figure 8E:
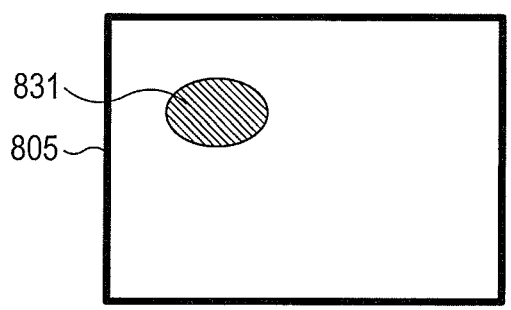

The final region identifying unit 106 identifies a final main object region from the salient main object candidate region which was output from the candidate region identifying unit 103 and the improper region which was output from the improper region identifying unit 105. That is, the region which is the salient main object candidate region and is not the improper region is output as a final main object region. A final main object region 831 identified in an image 805 is illustrated in FIG. 8E. The final region identifying unit 106 identifies the final main object region 831 from the salient main object candidate regions 821 to 823 which are input and the improper region 810. In the example illustrated in FIGS. 8A to 8E, since the salient main object candidate regions 822 and 823 are included in the improper region 810, they are excluded from the final main object region.

By the main object detecting apparatus 100 constructed as mentioned above, the information which is useful to the application using the detection result of the main object can be output.

Figure 5:
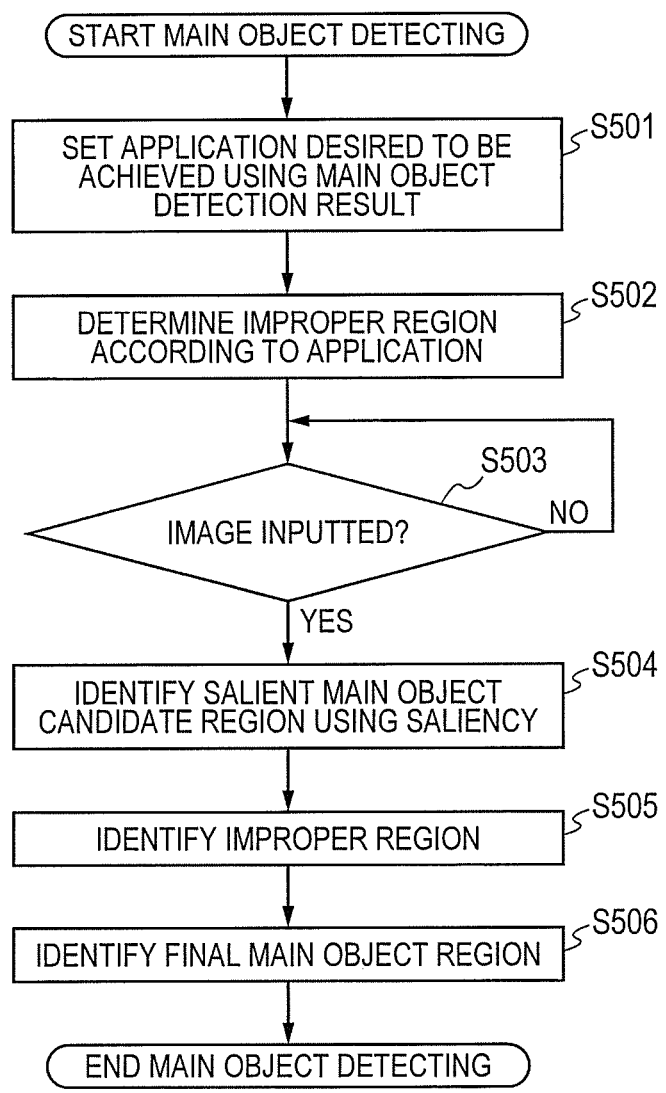
FIG. 5 is a flowchart illustrating an example of a processing procedure for detecting a main object region in the first embodiment.

FIG. 5 is a flowchart illustrating an example of a processing procedure for detecting the main object region in the first embodiment.

First, in S501, the application setting unit 101 inputs the mode information from the outside and sets an application desired to be achieved by using the main object detection result. The set application is output as application information to the designated condition determining unit 104.

Subsequently, in S502, on the basis of the application information which was input, the designated condition determining unit 104 selects the condition of the region (improper region) which is not used as a main object detection result. A selection result is output as an improper region condition to the improper region identifying unit 105. Subsequently, in S503, the apparatus waits until the input image is input to the main object detecting apparatus 100.

When the input image is input to the main object detecting apparatus 100, in S504, the salient region detecting unit 102 forms salient region information to the input image. The candidate region identifying unit 103 identifies a candidate region of the main object on the basis of the salient region information and outputs as a salient main object candidate region to the final region identifying unit 106. Further, in S505, the improper region identifying unit 105 identifies the improper region on the basis of the improper region condition which is input. Since the processes of S504 and S505 are independent processes, any one of those processes may be executed first or may be executed in parallel.

Subsequently, in S506, the final region identifying unit 106 identifies a final main object region from the salient main object candidate region and the improper region which are input.

As mentioned above, according to the embodiment, the main object detection based on the saliency can be realized while excluding the improper region. That is, the region which is not useful to the application desired to be achieved by using the detection result of the main object can be excluded. Therefore, the main object detection result which is useful to achieve the application can be easily output.

(Second Embodiment)

The second embodiment will be described with respect to an example in which in case where there are a plurality of applications desired to be achieved by using the main object detection result, the main object region is detected to the plurality of applications while switching the applications or is simultaneously detected to the plurality of applications. First, the example in which when there are a plurality of applications, the main object region is detected while switching the applications will be described. Since a construction of the main object detecting apparatus according to the second embodiment is similar to that illustrated in FIG. 1, its description is omitted here.

Figure 6:
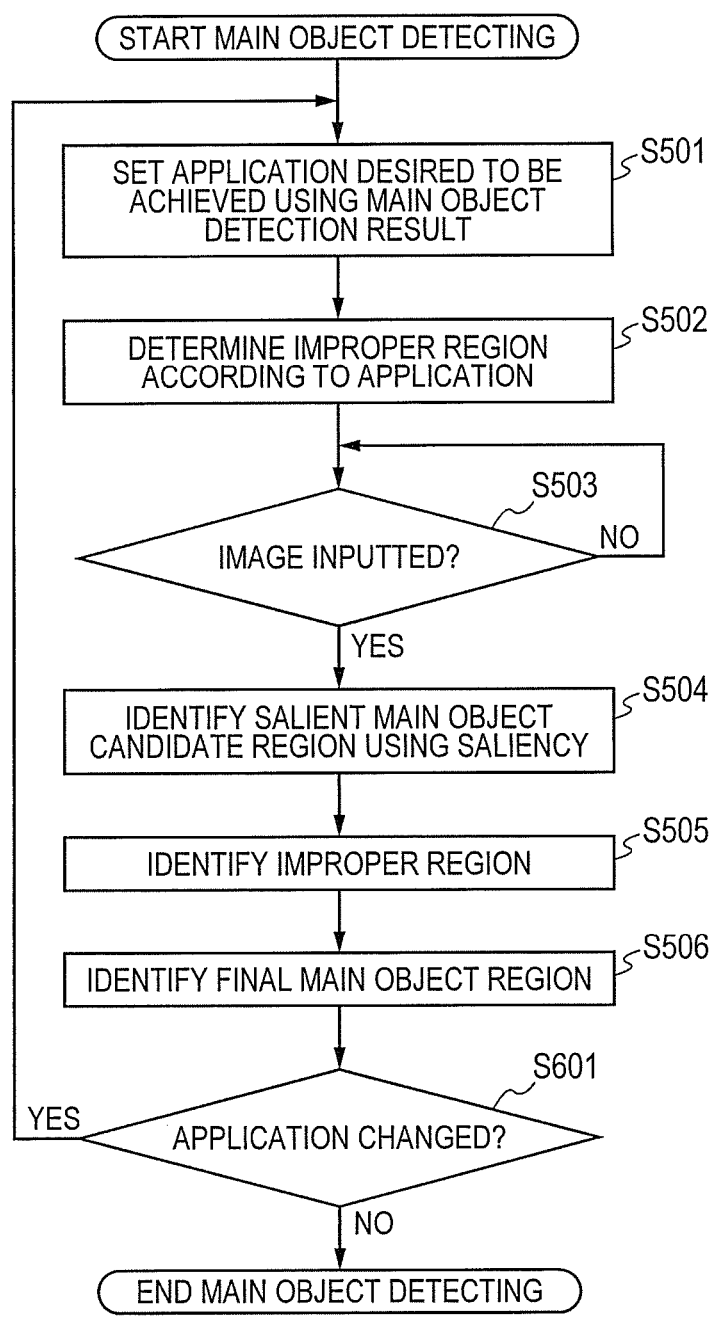
FIG. 6 is a flowchart illustrating an example of a processing procedure for detecting a main object region in the second embodiment.

FIG. 6 is a flowchart illustrating an example of a processing procedure for detecting a main object in the embodiment. In FIG. 6, processes overlapped with those in FIG. 5 are designated by the same step numbers as those in FIG. 5 and their description is omitted here.

When the final main object region is detected in S506, in S601, the application setting unit 101 discriminates whether or not the application using the main object detection result has been changed. As a result of the discrimination, if the application has been changed, the processing routine is returned to S501 and the application setting unit 101 sets the changed application. The set application is output as application information to the designated condition determining unit 104.

Consequently, when there are a plurality of applications, the main object can be detected while switching the applications. For example, if AF has initially been set as an application using the detection result of the main object, AF is output as application information from the application setting unit 101. After that, if the application is changed to auto-tracking, auto-tracking is output as application information. Further, the improper region condition which is output from the designated condition determining unit 104 on the basis of the application information is also changed from "low contrast" initially corresponding to AF to "scenery image" (or "equal texture in whole of the image") corresponding to auto-tracking.

As mentioned above, even in the case where the improper region designated condition differs in each of a plurality of applications, since the main object can be detected while switching the improper region designated conditions, the detection result of the main object which is useful to each application can be obtained.

Subsequently, an example in which a plurality of applications are simultaneously realized by using the detection result of the main object will be described. For example, a case of auto-tracking while auto-focusing on the region serving as a detection result of the main object will now be considered. A processing procedure in this case is similar to that in the flowchart shown in FIG. 5. In such a case, for example, the application setting unit 101 sets a plurality of applications desired to be simultaneously achieved such as AF and auto-tracking. A plurality of application information are output as application information.

The improper region conditions which are output from the designated condition determining unit 104 on the basis of the plurality of application information also correspond to each of the application information. For example, the two improper region conditions such as "low contrast" corresponding to AF and "scenery image" (or "equal texture in whole of the image") corresponding to auto-tracking are output. The improper region identifying unit 105 identifies an improper region in accordance with each of the plurality of improper region conditions, and the improper region corresponding to each of the improper region conditions is output. At this time, such an improper region that a plurality of improper regions corresponding to the plurality of improper region conditions are merged may be output.

The final region identifying unit 106 identifies a final main object region from the salient main object candidate region which is input and the plurality of improper regions. In this case, in order to simultaneously realize a plurality of applications by using the detection result of the main object, a region which is the salient main object candidate region and does not belong to any one of the plurality of improper regions is output as a final main object region.

(Third Embodiment)

In the third embodiment, an example in which a final main object region is decided by a method different from those in the first and second embodiments will be described.

In the first and second embodiments, the region which is the salient main object candidate region and does not belong to the improper region is output as a final main object region. That is, a reliability of the salient main object candidate region identified by the candidate region identifying unit 103 is implicitly set to 100%, similarly, a reliability of the improper region identified by the improper region identifying unit 105 is also implicitly set to 100%, and the final main object region is discriminated. On the other hand, in the third embodiment, a method whereby a reliability of the salient main object candidate region and a reliability of the improper region are calculated and the final main object region is discriminated on the basis of those reliabilities will be described.

FIG. 7 is a block diagram illustrating an example of a functional construction of a main object detecting apparatus 700 according to the third embodiment. In FIG. 7, since the same component elements as those in FIG. 1 are designated by the same reference numerals as those in FIG. 1, their description is omitted here. In FIG. 7, although information which is input to the main object detecting apparatus 700 is substantially the same as that in the case of the main object detecting apparatus 100 in FIG. 1, information which is output is the final main object region and its reliability (hereinbelow, referred to as a final score).

A candidate region identifying unit 703 identifies a main object candidate region based on a saliency by using the salient region information which is output from the salient region detecting unit 102, and calculates a reliability of a result of the identification (hereinbelow, referred to as a candidate score).

In the embodiment, a machine learning is used to identify the main object candidate region based on the saliency (salient main object candidate region). That is, a number of images for learning in which a correct main object region is shown are prepared, the process of the salient region detecting unit 102 is executed to the learning images, and salient region information (coordinates of a center of gravity of a region having a saliency exceeding a threshold value, an area, a saliency per area, and the like) is calculated. Elements of the salient region information are listed up to thereby form a feature vector. A case where the salient region almost coincides with the correct main object region is learned as a positive case. A case where the salient region does not almost coincide with the correct main object region is learned as a negative case. Although a learning method is not particularly limited, a well-known technique such as Support Vector Machine (SVM), logistic recursion, or the like may be used. As a result of the machine learning, a discrimination circuit to identify the salient main object candidate region is calculated. It is now assumed that before the main object detection is started, the machine learning is executed and the discrimination circuit prepared.

As mentioned above, in the case of identifying the salient main object candidate region by the machine learning, a number of learning images in which the correct main object region is shown are necessary. However, as mentioned above, the correct main object region is inherently a region which can be known only by the photographer himself of the image. There are many cases where it is difficult to allow the photographer to confirm the correct main object regions to all of the learning images. Therefore, it is sufficient to use such a method that a number of persons other than the photographer are made to presume the main object regions and a result of a majority decision is set to the correct main object region. The correct main object region becomes a region which has been set independently of the application desired to be achieved by using the main object detection result.

Subsequently, a method of identifying the salient main object candidate region by the candidate region identifying unit 703 by using the machine learning result and a method of calculating the candidate score will be described. When salient region information of an image desired to identify the salient main object candidate region is input, the salient region information is input as a feature amount to the prepared discrimination circuit. The salient main object candidate region is identified from an identification result obtained by the input. An intermediate value to obtain the identification result (value adapted to classify positive/negative by executing a threshold value process) is set to the candidate score. As a specific intermediate value, for example, in the case of using SVM to the machine learning, it is sufficient that a distance from a separation hyperplane which is obtained by the learning to the feature vector is set to the candidate score. In the case of using the logistic recursion to the machine learning, it is sufficient that an output value from a logistic function is set to the candidate score.

In the candidate region identifying unit 703, the salient main object candidate region identified in this manner and its candidate score are output to a final region identifying unit 706. For example, when the region identified by the candidate region identifying unit 703 is the region as illustrated in FIG. 8C, a pair of candidate scores are output for each of the identified salient main object candidate regions 821 to 823.

An improper region identifying unit 705 identifies an improper region on the basis of the improper region condition which was output from the designated condition determining unit 104, and calculates a reliability of its identification result (hereinbelow, referred to as an improper score). For example, when the condition of "low contrast" is input as an improper region condition, there is considered a case where a region whose edge integration value is smaller than a predetermined value is set to the low contrast region and a reciprocal number of the edge integration value is output as an improper score. A reason why the reciprocal number of the edge integration value is output as an improper score is that the region whose edge integration value is small is the low contrast region (region in which the improper score is high).

In a manner similar to the case of the candidate region identifying unit 703, the improper region may be identified or the improper score may be calculated by using the machine learning. For example, if the condition of "scenery image" is input as an improper region condition, a combination of predetermined tiles may be learned as a feature amount and the discrimination circuit may be prepared. In the case of using the machine learning, in a manner similar to the case of the candidate region identifying unit 703, the improper region is identified from the discrimination result. An intermediate value to obtain the discrimination result (value adapted to classify positive/negative by executing the threshold value process) is set to the improper score. In the improper region identifying unit 705, the improper region identified in this manner and its improper score are output. For example, if the region identified by the improper region identifying unit 705 is the region as illustrated in FIG. 8D, a pair of improper scores are output to the identified improper region 810.

The final region identifying unit 706 identifies a final main object region from the salient main object candidate region and the candidate score which are input from the candidate region identifying unit 703 and the improper region and the improper score which are input from the improper region identifying unit 705. In the first embodiment, the region which is the salient main object candidate region and is not the improper region is set to the final main object region. That is, all of the salient main object candidate regions are handled as an equal region and, similarly, all of the improper regions are also handled as an equal region.

On the other hand, in the embodiment, since the candidate score and the improper score are also considered, even the equal salient main object candidate region can be level-classified into the region which is reliable as a main object candidate and a region which is not reliable. Therefore, even in the case of the region which is the salient main object candidate region and is not the improper region, when the candidate score is small and the improper score is large to a certain extent, it can be determined in such a manner that such a region is not set to the final main object region, or the like. Similarly, in the case of the region which is the improper region, if it is a salient main object candidate region in which the candidate score is large, it can be determined in such a manner that such a region is set to the final main object region, or the like.

Further, the final region identifying unit 706 calculates a reliability to the final main object region (final score). For example, the final score is assumed to be a value obtained by subtracting the improper score from the candidate score which is input. By calculating the final score in this manner, the region in which the candidate score is high and the improper score is small has the high final score and it is rational as a reliability.

As mentioned above, according to the main object detecting apparatus 700 of the embodiment, by using the candidate score and the improper score, the final main object region can be more flexibly discriminated. By outputting the final score together with the final main object region, the application using the main object detection result can be also more flexibly realized. That is, in the application, the result of the final main object region can be used with reference to the final score. Therefore, in such an application that it is desired to avoid an erroneous detection as much as possible, such an application that only the result whose final score is higher than a predetermined value is used can be used.

The calculating method of the reliability shown in the embodiment is shown as an example and the calculating method is not particularly limited so long as it is a value which expresses a degree of likelihood of the salient main object or a degree of likelihood of the improper region. As a use of the main object detection, although the case where it is used in the digital camera has been described above, the invention is not limited to such an example. As for the calculating method of the saliency, although the method whereby the histograms are formed to the data groups which are obtained in the two regions and the differential absolute value sum is calculated per each of the bins for both histograms has been shown, the invention is not limited to such a method.

According to the invention, the detection result of the object which is useful to the application can be obtained.

Other Embodiments

Figure 1A:
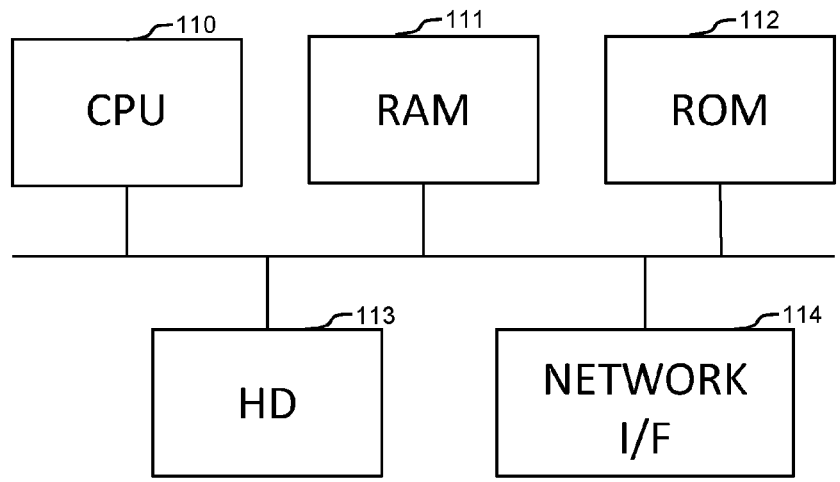

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). As shown in FIG. 1A, the computer may comprise one or more processors (e.g., central processing unit (CPU) 110, micro processing unit (MPU)) and may include a network of separate computers or separate processors to read out and execute the computer executable instructions. The computer executable instructions may be provided to the computer, for example, from a network 114 or the storage medium. The storage medium may include, for example, one or more of a hard disk 113, a random-access memory (RAM) 111, a read only memory (ROM) 112, a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-097871, filed May 9, 2014, which is hereby incorporated by reference herein in its entirety.

What is claimed is:

1. An object detecting apparatus comprising:
at least one memory; and
at least one processor connected to the memory and configured to execute instructions that, when executed, cause the object detecting apparatus to:
identify a candidate region of an object based on an input image;
calculate a first score indicating reliability of the candidate region;
set a region to be excluded from the candidate region of the object in the input image, according to an application using information of the object;
calculate a second score indicating reliability of the region to be excluded; and
detect a region of the object based on the identified candidate region, the set region to be excluded, the first score, and the second score.

2. The object detecting apparatus according to claim 1, wherein the at least one processor is further configured to execute instructions that, when executed, cause the object detecting apparatus to determine a condition for excluding the region to be excluded from the candidate region of the object, according to the application using the information of the object, and
wherein the region to be excluded from the candidate region of the object in the input image is set according to the determined condition.

3. The object detecting apparatus according to claim 2, wherein the at least one processor is further configured to execute instructions that, when executed, cause the object detecting apparatus to, when a plurality of the applications are available, determine conditions for excluding one or more regions to be excluded from the candidate region of the object, according to the applications, and
detect the regions of the object, per each of the applications.

4. The object detecting apparatus according to claim 2, wherein the at least one processor is further configured to execute instructions that, when executed, cause the object detecting apparatus to, when a plurality of the applications are available, determine conditions for excluding one or more regions to be excluded from the candidate region of the object, according to the applications, and
detect the regions of the object by excluding from the identified candidate region, the one or more regions to be excluded per each of the applications.

5. The object detecting apparatus according to claim 2, wherein the conditions for excluding the region include one of a scenery image, an equal texture in whole of the image, or a low contrast.

6. The object detecting apparatus according to claim 1, wherein the at least one processor is further configured to execute instructions that, when executed, cause the object detecting apparatus to detect the region of the object by excluding the set region to be excluded from the identified candidate region.

7. The object detecting apparatus according to claim 1, wherein the at least one processor is further configured to execute instructions that, when executed, cause the object detecting apparatus to identify the candidate region of the object by calculating a saliency at each position in the input image.

8. The object detecting apparatus according to claim 7, wherein the at least one processor is further configured to execute instructions that, when executed, cause the object detecting apparatus to calculate the saliency based on a distance between two regions of data groups acquired by scanning the input image.

9. The object detecting apparatus according to claim 7, wherein the at least one processor is further configured to execute instructions that, when executed, cause the object detecting apparatus to form a map in which the calculated saliency is imaged, and identify the candidate region of the object based on the formed map.

10. The object detecting apparatus according to claim 1, wherein the application is one of an auto-focus, an auto-exposure control or an auto-tracking of an imaging apparatus.

11. An object detecting method comprising:
identifying a candidate region of an object based on an input image;
calculating a first score indicating reliability of the candidate region;
setting a region to be excluded from the candidate region of the object in the input image, according to an application using information of the object;
calculating a second score indicating reliability of the region to be excluded; and
detecting a region of the object based on the identified candidate region, the set region to be excluded, the first score, and the second score.

12. A non-transitory computer-readable storage medium storing a readable program for operating a computer to execute an object detecting method comprising:
identifying a candidate region of an object based on an input image;
calculating a first score indicating reliability of the candidate region;
setting a region to be excluded from the candidate region of the object in the input image, according to an application using information of the object;
calculating a second score indicating reliability of the region to be excluded; and
detecting a region of the object based on the identified candidate region, the set region to be excluded, the first score, and the second score.

* * * * *